Feb. 20, 1923.

W. A. BARKER

LOCKING DEVICE FOR SCREWS

Filed Jan. 27, 1921

1,445,818

Witness.
Carl G. Anderson.

Inventor:
Wendell A. Barker.
By Samuel N. Pond,
Atty.

Patented Feb. 20, 1923.

1,445,818

UNITED STATES PATENT OFFICE.

WENDELL A. BARKER, OF ELKHART, INDIANA; ROLLA BARKER FERREBY ADMINISTRATOR OF SAID WENDELL A. BARKER, DECEASED.

LOCKING DEVICE FOR SCREWS.

Application filed January 27, 1921. Serial No. 440,318.

*To all whom it may concern:*

Be it known that I, WENDELL A. BARKER, a citizen of the United States, residing at Elkhart, in the county of Elkhart, State of Indiana, have invented certain new and useful Improvements in Locking Devices for Screws, of which the following is a specification.

This invention relates to an improved device for locking screws against accidental turning, and constitutes a continuation in part of an application heretofore filed by me on the 5th day of July 1919, Serial No. 308,888 for improvements in chucks, the same having eventuated in Letters Patent No. 1,389,731, dated September 6, 1921. The device of the present invention has been designed more especially as a friction locking device for adjusting screws of chuck jaws, to prevent accidental turning or yielding of such screws under the pressure applied to the jaws when the latter are clamped upon the work, or when the jaws are disengaged and the chuck running.

The object of the invention is to provide a simple, inexpensive and reliable device in the general nature of a friction clamp or grip to hold the screw against accidental turning, while permitting manual adjustment of the jaw by a wrench applied to the screw in the usual manner.

My invention, its mode of use, and the advantages inherent therein will be readily apparent to persons skilled in the art as the invention becomes better understood by reference to the following detailed description, taken in connection with the accompanying drawing in which I have illustrated two practical forms or embodiments of the principle of the invention, and wherein—

Figure 1:
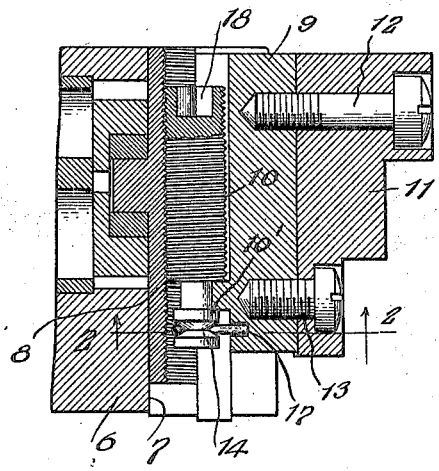
Fig. 1 is a fragmentary radial section thru a portion of a chuck head and jaw, taken in the plane of the adjusting screw.
Figure 2:
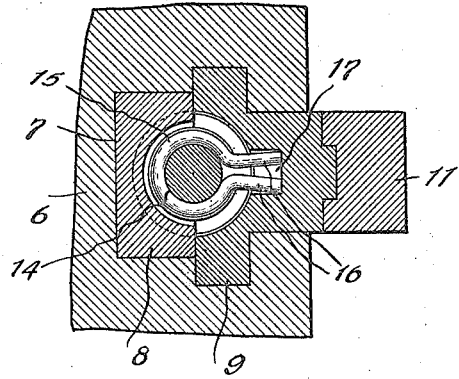
Fig. 2 is a transverse section on the line 2—2 of Fig. 1.
Figure 3:
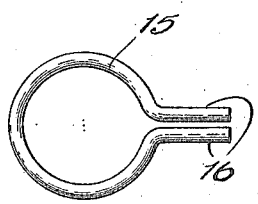
Fig. 3 is an enlarged detail plan view of the screw grip or clamp shown in Figs. 1 and 2.

Referring first to Figs. 1, 2 and 3, I have shown in Figs. 1 and 2 those parts of a chuck with which the adjusting screw and the screw clamp or grip immediately cooperate. 6 designates the hollow hub of a chuck body which is designed to be mounted upon the spindle (not shown) of a lathe or like machine in a manner well understood. In a radially arranged groove 7 formed in the front face of the chuck body is mounted a gripping or work holding jaw, comprising inner and outer jaw base members 8 and 9 which are adjustable lengthwise relatively to each other by means of a jaw screw 10, and a jaw proper 11, herein shown as of the reversible step jaw type secured to the outer jaw base member 9 by screws 12 and 13. This construction of chuck jaw is old and well known in the art, except as to my improved friction grip or clamp for preventing accidental turning of the jaw screw 10.

Referring now to those features of improvement in which the present invention chiefly resides, 10' designates the circular head of the screw 10, which is formed with a circumferential V-shaped groove 14, in which is sprung a friction split ring 15 having radially projecting end portions 16 lying side by side and disposed within a socket 17 formed in the jaw base member 9 directly opposite the groove 14 of the jaw screw. The ring 15 is made of highly tempered steel so as to possess a high degree of elasticity; and, before application to the screw, has an internal diameter slightly less than the diameter of the portions of the V-shaped groove with which it engages, so that, when sprung into place, it hugs the V-groove with a sufficient grip to hold the screw against accidental turning or yielding under the maximum pressures transmitted through the chuck jaw. The laterally disposed ends 16 are disposed within the socket 17 and thereby lock the friction ring against turning movement. The frictional grip of the ring on the jaw screw, however, does not interfere with the adjustment or setting of the latter by a square tool entered in a correspondingly shaped socket 18 in the upper end of the screw, as is usual.

Figure 4:
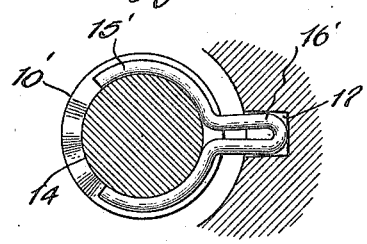
Fig. 4 is a view similar to Fig. 2, illustrating another form of screw grip or clamp embodying the principles of the invention.
Figure 5:
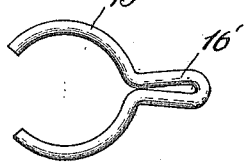
Fig. 5 is a detail plan view of the grip or clamp shown in Fig. 4.

Figs. 4 and 5 illustrate a slightly different form of frictional grip or clamp, wherein the ring 15' is split on the opposite side from that shown in Figs. 1, 2, and 3 and is formed with an integral laterally offset loop or shank 16' which is engaged with the jaw socket 17 in the same manner and for the same purpose as the arms 16. In this construction also, the ring member 15' before its application to the V-groove of the screw, is of slightly smaller internal diameter than that of the walls of the groove at the point of engagement of the latter by the ring, so that the latter hugs the groove with sufficient friction to effectively lock the screw against accidental turning.

The device of the invention holds the screw against accidental turning both when the jaws are engaged with the work, and also when the jaws are disengaged and the chuck running, at which time the centrifugal force of the jaws and the loosening combined have a tendency to unscrew the jaws.

I claim:

1. In a chuck, the combination of a pair of relatively slidable jaw members, a jaw screw between said members for effecting relative adjustment thereof, an elastic ring non-rotatably held by one of said jaw members and frictionally gripping said jaw screw.

2. In a chuck, the combination of a pair of relatively slidable jaw members, one of which is formed with a socket, a jaw screw between said members for effecting relative adjustment thereof, and an elastic split ring frictionally gripping said screw and formed with an offset portion confined in said socket.

3. In a chuck, the combination of a pair of relatively slidable jaw members, one of which is formed with a socket, a jaw screw between said members for effecting relative adjustment thereof, said jaw screw being formed with an annular V-shaped groove, and a split steel ring frictionally gripping the walls of said groove and provided with a radial projection confined in said socket.

WENDELL A. BARKER.